UNITED STATES PATENT OFFICE.

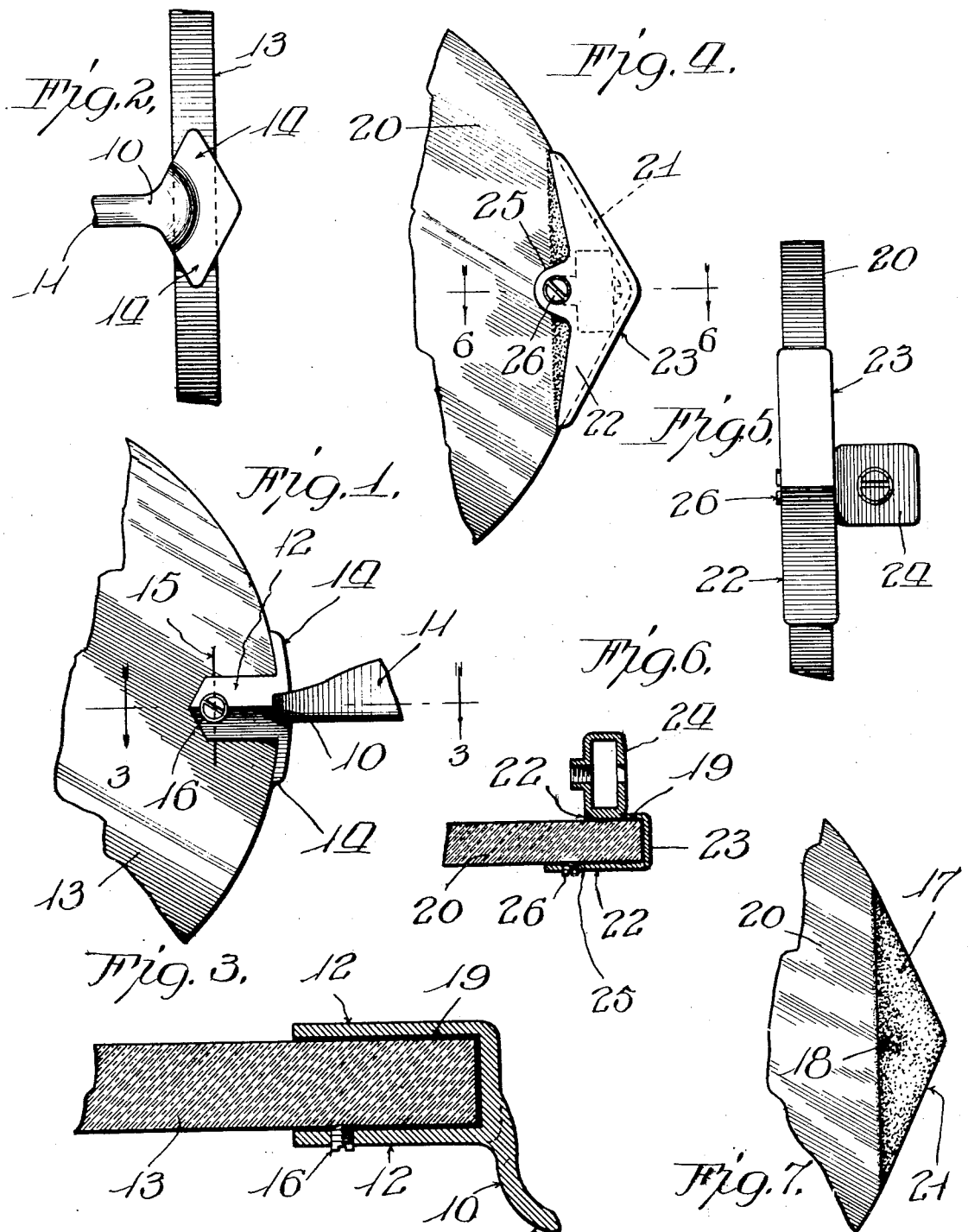

PAUL H. JOHNSTON, OF DAVENPORT, IOWA.

SPECTACLE OR EYEGLASS MOUNTING.

1,196,115. Specification of Letters Patent. Patented Aug. 29, 1916.

Application filed July 15, 1915. Serial No. 39,944.

*To all whom it may concern:*

Be it known that I, PAUL H. JOHNSTON, a citizen of the United States, and a resident of the city of Davenport, county of Scott, and State of Iowa, have invented certain new and useful Improvements in Spectacle or Eyeglass Mountings, of which the following is a specification.

My invention relates to spectacle or eyeglass mountings, and, more particularly, to the means or manner of securing the lenses of spectacles or eye-glasses to the nose-pieces or bridges and temples or bows thereof.

Heretofore divers methods have been employed to fasten or secure the lenses to the bridge, and temples one of these methods consisting of boring or piercing the lens adjacent its outer edge and tapping a small screw or rivet through the same and through the lens ears mounted on or forming a part of the bridge and end-piece. This has several disadvantages because, owing to the brittle and fragile character of the lens, it frequently breaks during the boring operation causing considerable loss and also owing to the fact that the boring weakens the lens to such an extent that a slight lateral pressure often severs them from the nose-piece. When a screw or rivet is alone depended upon to secure the lenses in place, it is difficult to rigidly secure the lenses in place without placing an undesirable strain upon the glass, and screws or rivets are always liable to, and often do work loose, thereby permitting play between the lens and its mounting and necessitating adjustment or repair. Another method consists in the employment of a cement to hold the lenses in a box on the bridge and end-pieces, which method is found unreliable, owing to the breaking or letting go of the cement when dried and set and its loosening or cracking when the glasses were roughly used, causing the accidental displacement of the lenses.

It is therefore an object of my invention to provide a means for mounting the lenses in the bridge and end-pieces in a manner so that the above-noted objections are successfully overcome.

Another object is the provision of a device of this character, wherein the lenses are securely held in place without altering or weakening them, and so arranging the parts that the danger of accidental removal or breakage is avoided.

Still another object of my invention is the provision of a mounting for spectacles and eye-glasses that is simple in construction, effective in operation, easy to manipulate and assemble, and which is comparatively inexpensive to manufacture, so that it will not add to the cost to the consumer.

I prefer to accomplish the divers objects of my invention by the means and in the manner hereinafter fully described and as more particularly pointed out in the claims, reference being had to accompanying drawings forming a part of this specification, wherein, Figure 1 is a plan of the preferred form of my improved spectacle and eye-glass mounting, drawn to an enlarged scale and only a fragmentary portion thereof being illustrated. Fig. 2 is an end view thereof. Fig. 3 is an exaggerated section thereof taken on line 3—3, Fig. 1, looking in the direction of the arrows. Fig. 4 is a plan of a modified construction of my invention. Fig. 5 is an end view thereof. Fig. 6 is a sectional view taken on line 6—6, of Fig. 4, looking in the direction of the arrows. Fig. 7 is an enlarged detail of a portion of a lens showing a manner of preparing the same for mounting.

Referring more particularly to Figs. 1, 2 and 3 of the drawings, it will be observed that the stud, 10, projecting from the end of the bridge 11, is provided at its end with laterally-disposed ears, 12. These ears are preferably disposed in planes parallel to each other, and are spaced apart a distance sufficient to accommodate the lens 13. Suitable oppositely-disposed straps, 14, project at substantially right angles to these ears 12, in opposite directions from the stud, 10, and the inner faces of these straps are preferably segmental-shaped so as to substantially conform with the curvature of the edge of the lens. These straps are preferably tapered or pointed, as shown in Fig. 2 of the drawings, and the ears are substantially triangular in shape in cross section and tapered or pointed at their outer ends. In order to secure the lens, 13, in the box-like structure formed by the ears, 12, and straps, 14, I prefer to place a slight score or scratch or indentation 15, transversely to the major axis of the lens, by means of a file drill or other suitable instrument, this score, or other indentation 15, is preferably a distance from the edge of the lens, corresponding to the axis of a set screw, 16, that is adapted to be tapped through one of the ears 12, so that its inner end impinges against the lens directly at the point of the score. This score, or indentation, 15, is preferably very short and in lieu thereof it may be found desirable to roughen the surface of the lens as shown at 17 in Fig 7, or form a shallow recess, 18, adjacent the edge of the lens, as shown in dotted lines in Fig. 7. While I have described the roughening of the lens at the point where the set screw, 16, will contact therewith, a very firm and dependable mounting of the lens can be secured without so roughening the surface of the lens.

Prior to assembling the lens in the box, I prefer to coat the interior walls of the latter with a suitable cementitious material, 19, such as a water-glass composition or an appropriate fusible cement, and after the lens has been properly positioned therein, to turn down the screw, 16, preferably before the cement has set until the lens is tightly clamped between the ears.

Referring now more particularly to Figs. 4, 5 and 6, of the drawings, wherein I have illustrated a modified construction of my improved box, it will be observed that the lens, 20, is provided with a slightly extended portion, 21, and the box is preferably constructed with side walls, 22, of substantially triangular shape, and an end wall, 23, that connects said side walls. Extending from one of these walls is a suitable yoke or bracket, 24, whereby the bridge and nose-piece are secured to the lens box. One of the walls is provided with a lateral extension, 25, that forms a screw-boss through which a suitable screw, 26, is adapted to be tapped so as to engage the lens fitted in the box at a point upon its roughened surface, 17, or to seat in a score, 15, or a socket, 18, as heretofore described. In this construction the cement, 19, is coated upon the walls of the box prior to the assembling with the lens and after proper adjustment, the screw is turned down firmly against the lens preferably before the cement has set.

From the above it will be obvious that when the cementitious material hardens and sets, a portion of it will surround the threads of the screw and tend to lock the same against accidental rotation. It will also be obvious that the lens itself has not been injured or rendered liable to breakage, such as would be possible when the same is bored through or sawed radially inwardly from the circumference. In practising my invention it will be found that the set-screw, without the use of any cement, will secure the lens in the mounting so that it cannot be readily removed therefrom, but by the use of both a clamping set-screw and the cement, I have prevented the accidental removal or loosening of the set-screw and have much reduced the service ordinarily required of either the set-screw or the cement when employed separately. When it is realized that the special difficulty with cemented mountings arises from the fact that small initial stress is the occasion of the breaking or letting go of the cement, it will be seen how important and necessary my invention is in securing an additional mechanical resistance to such initial movements and the securing of a dependable cemented mounting.

While I have shown and described certain specific means for carrying out my invention, it, of course, will be obvious to others skilled in the art to which it pertains, that various modifications and refinements thereof are possible without materially departing from the spirit of my invention. I therefore desire it understood that all such changes are contemplated as coming within the scope of my invention as expressed in the following claims.

What I claim is:—

1. A spectacle or eye-glass mounting comprising a nose piece bridge and temple ends each having members adjacent the ends thereof, and each consisting of a plate for contacting the perimeter of a lens, lateral extensions adapted to extend upon each side of the lens, an element inserted through one of said extensions so as to impinge against a surface of the lens, a lens, and a cementitious material disposed between the lens-contacting portion of said members and said lens.

2. A spectacle or eye-glass mounting having lens holding members, each provided with a recess adapted to receive the edge of a lens, a set-screw tapped through a wall of said member and adapted to impinge against a side of a lens, a lens, and a cementitious material disposed between the lens-contacting portions of said member and said lens.

3. A spectacle or eye-glass mounting comprising a nose-piece or a bridge and temple ends each having members adjacent the ends thereof, and each consisting of a plate for contacting the perimeter of a lens, lateral extensions adapted to extend upon each side of the lens, a set-screw tapped through one of said extensions so as to impinge against a surface of the lens, a lens, the surface of said lens being roughened at the point of contact of said set-screw therewith, and a cementitious material disposed between the lens contacting portions of said members and said lens.

4. A spectacle or eye-glass mounting having lens holding members, each provided with a recess therein adapted to receive the edge of a lens, a set-screw tapped through a wall of said member and adapted to impinge against a side of a lens, a lens, the surface of said lens being roughened at the point of contact of said set-screw therewith.

5. In eyeglass construction, in combination, a lens clamp provided with a pair of spaced lugs, a lens fitted between said lugs and provided with a recess in one of its surfaces spaced from the edge of the lens and extending partially through the lens, the lug opposite said recess being provided with a projection fitting into said recess and adhesive means between the inner surfaces of said lugs and the contacting surfaces of said lens resisting movement of said lugs in a direction away from the surfaces which they contact.

Signed at Chicago, county of Cook and State of Illinois, this 12th day of July, 1915.

PAUL H. JOHNSTON.

Witnesses:
WM. HAROLD EICHELMAN,
E. K. LUNDY, Jr.